United States Patent
Bettinger

(10) Patent No.: US 6,333,726 B1
(45) Date of Patent: Dec. 25, 2001

(54) ORTHOGONAL PROJECTION CONCEALMENT APPARATUS

(76) Inventor: David S. Bettinger, 8030 Coventry, Grosse Ile, MI (US) 48138-1119

(*) Notice: Subject to any disclaimer, the term of this patent is extended or adjusted under 35 U.S.C. 154(b) by 0 days.

(21) Appl. No.: 09/451,721

(22) Filed: Dec. 1, 1999

(51) Int. Cl.$^7$ ............................................. G09G 3/36
(52) U.S. Cl. ........................ 345/87; 345/89; 345/629; 345/632; 345/55; 345/211; 348/122; 348/25; 348/36; 348/744
(58) Field of Search ..................... 345/87–89, 55, 345/60, 629–630, 681–682, 634–638, 641, 632–633, 211, 690–691, 694; 382/103, 173–174; 340/815.45; 353/31; 348/742–743, 25, 36, 122, 744; 356/4.01

(56) References Cited

U.S. PATENT DOCUMENTS

| | | | |
|---|---|---|---|
| 5,307,162 | * 4/1994 | Schowengerdt | 348/122 |
| 5,546,139 | * 8/1996 | Bacs, Jr. et al. | 348/754 |
| 5,644,386 | * 7/1997 | Jenkins et al. | 356/4.01 |
| 5,956,000 | * 9/1999 | Kreitman et al. | 345/1.1 |
| 6,115,022 | * 9/2000 | Mayer, III et al. | 345/418 |

\* cited by examiner

Primary Examiner—Richard Hjerpe
Assistant Examiner—Francis Nguyen

(57) ABSTRACT

A pixel array-based orthogonal projection concealment apparatus applicable for continuously matching a mobile platform to its changing background integrates power means, sensing and inputting means for observer and background data, programmed computational means, and pixel array display means in a single apparatus. In its preferred embodiment the concealment projection image is displayed through a liquid crystal array.

6 Claims, 3 Drawing Sheets

ORTHOGONAL PROJECTION CONCEALMENT APPARATUS

BACKGROUND OF THE INVENTION a) Field of the Invention

The present invention relates to an orthogonal projection concealment apparatus whereby automatic means of sensing observer position and distance, background distance, and guidance, continuous digital image capturing means, and algorithmic computational programming means combine to generate an orthogonal projection gray-scale image through an array of pixel display elements. More particularly this invention relates to an active concealment apparatus projecting an orthogonal background image on surfaces of a mobile platform, and blending the mobile platform into its background for a near distant observer under most lighting conditions.

b) Description of the Prior Art

In the prior art of mobile platform concealment, stationary vehicles were concealed with paint, netting, and vegetation, while moving vehicles were concealed with smoke. Smoke is an overt concealment rather than a covert concealment mechanism.

In the prior art of mobile platform concealment, lights mounted on an aircraft have been used to mask the dark area within a bright sky that betrays the presence of a flying plane. Under a Defense Advanced Research Project Agency (DARPA) program known as "Active Camouflage", a small powered drone was fitted with fluorescent lamps to make the aircraft harder to spot.

A similar approach was undertaken at Groom Lake Air Force Base in Nevada. The use of electrochromic materials coupled with photosensitive receptors and an onboard computer allows for adjusting the brightness, hue, and texture of an airplane surface to match the sky above or the terrain below it.

These two aircraft concealment efforts are covert. The Groom AFB test was responsive to changing background but the response result was a change in the entire surface of the aircraft to deceive an observer either above or below. Near distance covert concealment of a moving vehicle requires more control of the surface detail.

SUMMARY OF THE INVENTION

In order to overcome the above-mentioned deficiency and problems in the prior art, this invention teaches mobile platform active concealment utilizing a visual display system such that the concealment orthogonal projection image of the occulted background is displayed to the pixel element display array.

The term pixel may comprise, but is not limited to, a light shutter, an LED, plasma, and a liquid crystal display element. A pixel is defined as a light controlling, electro-actuated element.

The term mobile platform refers to tactical military vessels, planes, and vehicles.

1. Objects of the Invention

A general object of this invention is to provide a means of covert concealment and deception for masking mobile platforms from visual detection.

Another general object of this invention is to provide a means of covert concealment and deception for masking mobile platforms from visual detection while they are constantly moving.

An additional general object of this invention is to provide concealment from both direct and remote observation i.e., land based remote video observers and drone aircraft video observers.

A still additional general object of this invention is to integrate the computational algorithmic programming together with continuous video scanning, automatic range finding, and computer imaging into one apparatus.

A still additional object of this invention is to provide an active, automatic, and continuous apparatus integrated with background and observer sensing means as well as with computational algorithmic programming in real time.

2. Features of the Invention

In keeping with these objects and others which will become apparent hereinafter, one feature of the present invention resides, briefly stated, in the gray-scale pattern matching that is sufficient for mobile platform visual cloaking due to the perceived color interpretation that is muted by distance and the eye.

An additional feature of the present invention is a simple feedback mechanism using the cloaking charge coupled device camera which imparts to the computer the control array connections prior to actual operation.

A still additional feature of this invention is the flexible wiring connecting the array of pixel display elements to the computer controlled power supply grid without regard for individual pixel display element location.

The orthogonal projection concealment apparatus consists of a mobile platform, equipped with an internal power source, communicating power by and connected by appropriate wiring means to a power controller, communicating power by and connected by appropriate wiring means to a pixel array on said mobile platform surface consisting of a multiplicity of pixels, and said mobile platform further equipped with at least one means of sensing and manually inputing digital estimates of observer position and distance, and at least one means of sensing digital estimates of background distance automatically, and at least one means of continuously capturing digital background images, all means communicating electronic data by and connected by appropriate wiring means to said internal power source and additionally to, a microchip driven computing device, communicating data by and connected by appropriate wiring means to said power controller, and said computing device comprising, a pixel location database, and programmed means of observer visible pixel selection, and gray-scale determination means of occulted background position, and positional algorithmic computational means, and programmed means whereby said power controller activates an individual pixel to project an orthogonal image of a portion of said occulted background perpendicular to the observer in his line of sight, whereby the summing of the orthogonal images of all portions of said occulted background produces a concealed orthogonal projection of the total occulted background.

The computerized gray-scale image may be generated through multiple LCD pixel panels embedded in a conformable polymeric matrix sheet coating on the exterior surfaces of the mobile platform. The matrix sheet contains a multiplicity of pixels in an arbitrary arrangement closely resembling an array. The pixel array may be selected to be a rectilinear array of packets of liquid crystal material. Flexible wiring embedded in the polymer matrix is fed by strips on an edge of the sheet. Each packet is addressable by hard wiring just as pixels are on an active-matrix PC display. Each LCD packet is divided into small interconnected cells for surface integrity of the gelled liquid.

The pixel location database is resident to the microchip driven computing device. This pixel library is a compendium of pixel orientation located in three dimensional space, that is the mobile platform surface. At the program start this pixel library is loaded. The programmed means of observer visual pixel selection uses this library to calculate which pixels are visible to the observer.

The gray-scale determination means of occulted background position selects and matches the tonally averaged gray-scale value of the equivalency of an orthogonal background image element to that portion of the occulted background that corresponds to a particular pixel. This tonal signature is then transmitted to the power controller for activation response of the pixel.

The positional algorithmic computational means utilizes algorithmic programming to integrate direction, movement, and orientation of the mobile platform with respect to both the observer and the background.

It will be understood by one of ordinary skill in the art that the present invention functions for a reasonable number of concurrent variable observer positions.

It will be further understood by one of ordinary skill in the art that the liquid crystal display array can be backlighted either individually or as a group.

It will be still further understood by one of ordinary skill in the art that the positional algorithmic computational means is selected from the following algorithms.

1. Projected Frame: Concealment relies on selecting a portion of the charge coupled device background frame based on estimates of distances to observers and background.
2. Projected Frame(submarine operating in shallows): Concealment relies on selecting a portion of the charge coupled device background frame based on estimates of depth from observers and background.
3. Camera Roll: Image keystoning requires correction based on a sensor that indicates true vertical.
4. Mobile Platform Roll: A misplaced horizon line can be easily identified visually. The program must compensate.
5. Mobile Platform Turn: A turn toward the observer requires a shift in image portions to the mobile platform front.
6. Moving Morph: As the mobile platform accelerates and changes orientation to the observer's horizon, the image shifts.
7. Edge Blending: Fixed portions of the program must allow for lighter shading at mobile platform corners to avoid dark lines.
8. Edge Diffusion: The program must allow for lighter shading at surface junction points to insure diffusion.
9. Shadow Lighting: The dark shadow underneath the mobile platform must be washed out with moderated lighting.
10. Compromise Avoidance: The guidance computer will provide input to avoid objects difficult to match.
11. Parallax: Any concealment program must calculate the effect of a moving observer on the generated image.
12. Multiple Observer's: A statistical algorithm will be used to weigh multiple positional effects.
13. Background Ambient: The background light quality (reflected) must be matched by a gray-scale gradient.
14. Forward Ambient: The projected light quality (incident) must be matched to the nearest gray-scale gradient.
15. Chroma Adjustment: Basic adjustment must be made in the program for conversion of chroma to equivalent gray-scale.
16. Array Learning: A separate neural network program allows the array to self-index each pixel. This eliminates the necessity of wire tracing.

BRIEF DESCRIPTION OF THE DRAWINGS

The present invention is further described with reference to the accompanying drawings in which.

DETAILED DESCRIPTION OF THE DRAWINGS

Figure 1:
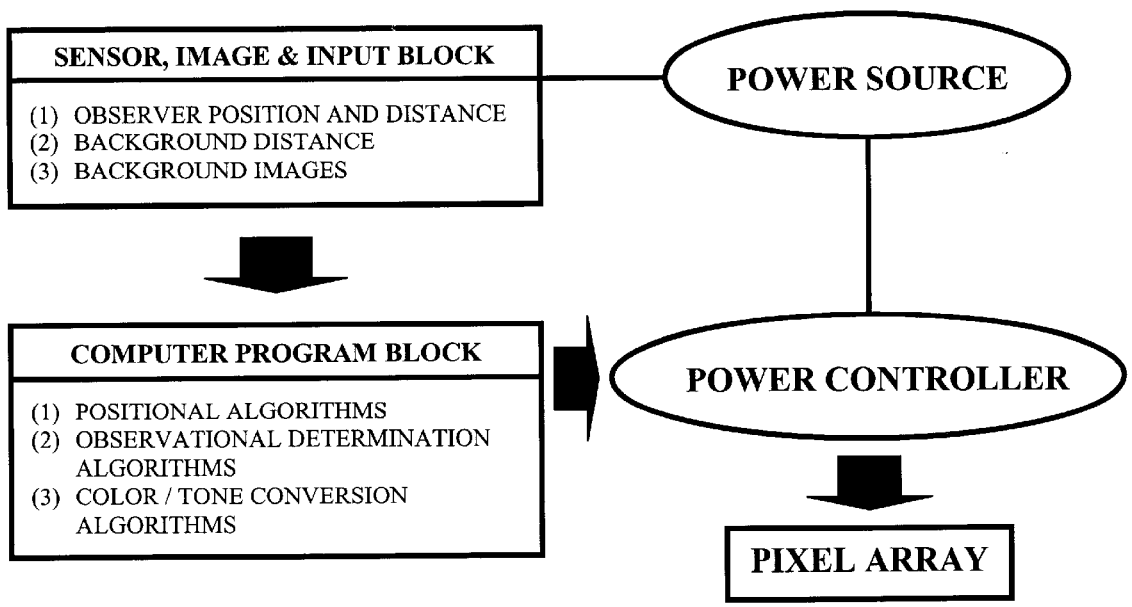
FIG. 1 is a schematic showing the relationship among the various components of the present invention described herein.

In FIG. 1 the orthogonal projection concealment apparatus consists of a mobile platform, equipped with an internal power source with power communicated by and connected by appropriate wiring means to a power controller. This power controller communicates power by and is connected by appropriate wiring means to a pixel array on the mobile platform surface consisting of a multiplicity of pixels.

The mobile platform is further equipped with a sensor, image and input block comprising of at least one means of sensing and manually inputting digital estimates of observer position and distance, and at least one means of sensing digital estimates of background distance automatically, and at least one means of continuously capturing digital background images.

These means are all communicating electronic data by and connected by appropriate wiring means to the internal power source and additionally to a microchip driven computing device or computer program block.

The computer program block is communicating data by and connected by appropriate wiring means to the power controller, and the computer program block comprises, positional algorithms, and observational determination algorithms, and evaluation programs to average background tone.

The means of sensing and manually inputting digital estimates of observer position and distance is selected from radar and sonar.

The means of sensing digital estimates of background distance automatically is selected from radar, sonar, and an acoustic system.

The means of continuously capturing digital background images is accomplished utilizing a digital video camcorder.

A break out box is utilized as the power controlling means. The break out box increases the power every time an individual pixel is addressed.

Figure 2:
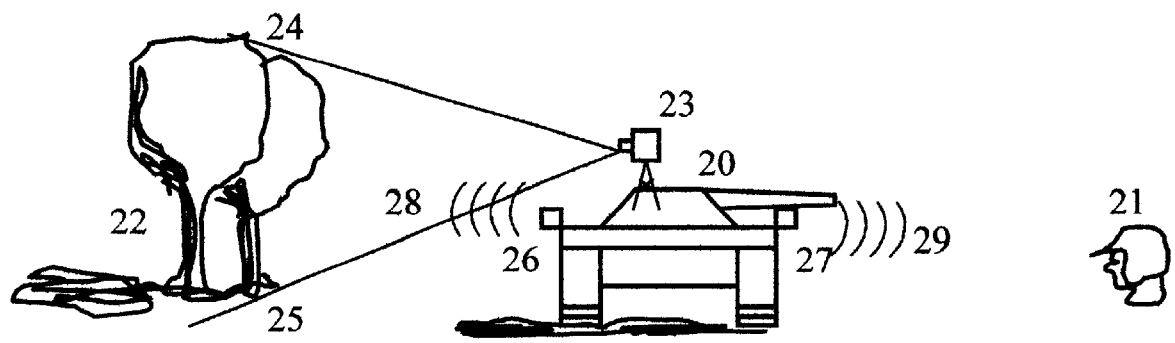
FIG. 2 is a side view illustrating the sensing and inputting of observer and background data by the sensors on the mobile platform.

In FIG. 2 an Abrams battle tank (20) utilizes a radar system (27) as the means of sensing observer position and distance (21). The invisible radar emissions are illustrated graphically by (29). An acoustic system (26) serves as the means of automatically sensing and estimating the background distance. The invisible acoustical emissions are illustrated graphically by (28). A digital video camcorder (23) continuously captures background images (22). The digital video camcorder (23) field of view is represented by the area between the exterior view lines (24,25).

Figure 3:
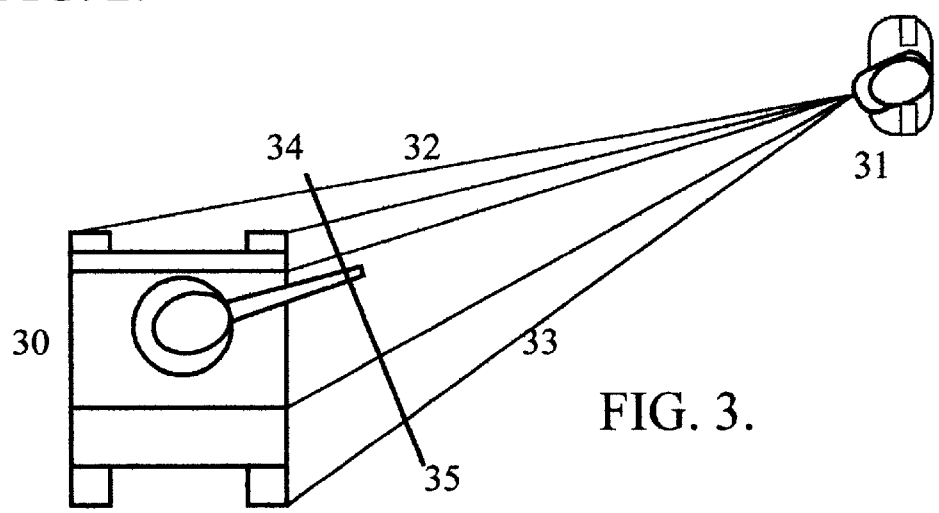
FIG. 3 is an illustration representing the activated pixels projecting an orthogonal image of the occulted background onto the virtual plane perpendicular to the observer in his line of sight.

In FIG. 3 the virtual plane (34,35) is assumed, calculated, and selected by the computational algorithms to be perpendicular to an observer (31). This calculation and selection is dependent upon observer position and distance (31). When an observer is abeam the virtual plane will be the side of the vehicle facing the observer. The computational algorithms are responsible for the forming and manipulation of pixels on the surface of the vehicle (30) which project an orthogonal image of a portion of the occulted background (36,37) perpendicular to the observer (31) in his line of sight defined by the exterior view lines (32,33).

Figure 4:
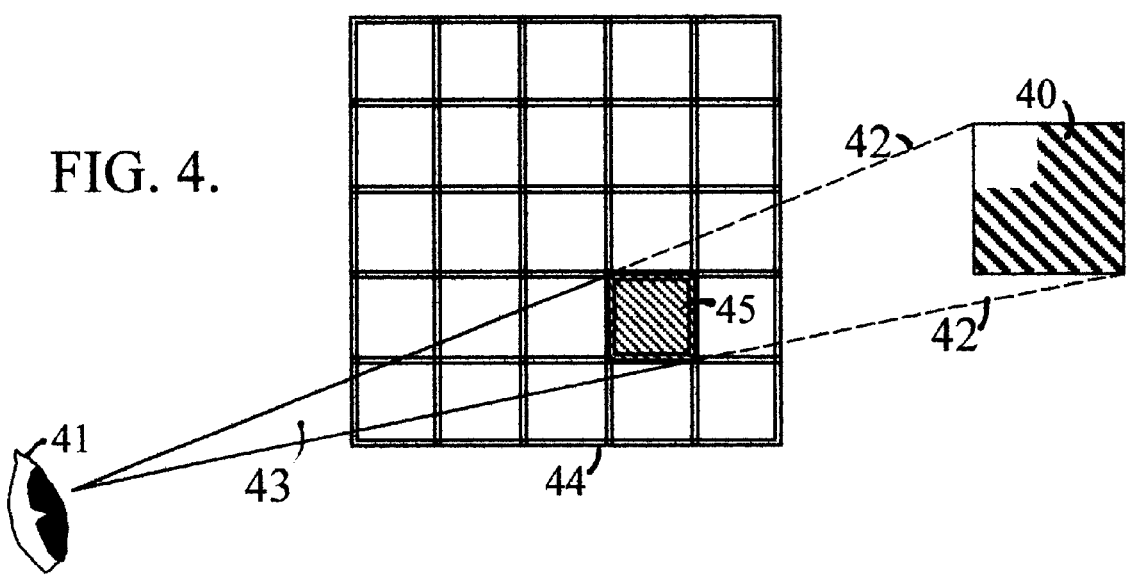
FIG. 4 is a schematic of the geometric and tonal relationship between an individual pixel and its equivalent portion of the occulted background.

In FIG. 4 the programmed means within the computing device selects an observer visible pixel (40). The gray-scale determination means of this occulted background position selects and matches the tonally averaged gray-scale value of this pixel to its equivalent orthogonal background image element (45) in the active matrix array (44). The programmed means also matches the geometric relationship (42) of this occulted background position (40) and its equivalent orthogonal background image element (45) in the active matrix array (44) to the geometric relationship (43) of the equivalent orthogonal background image element (45) in the active matrix array (44) and the observer (41).

Figure 5:
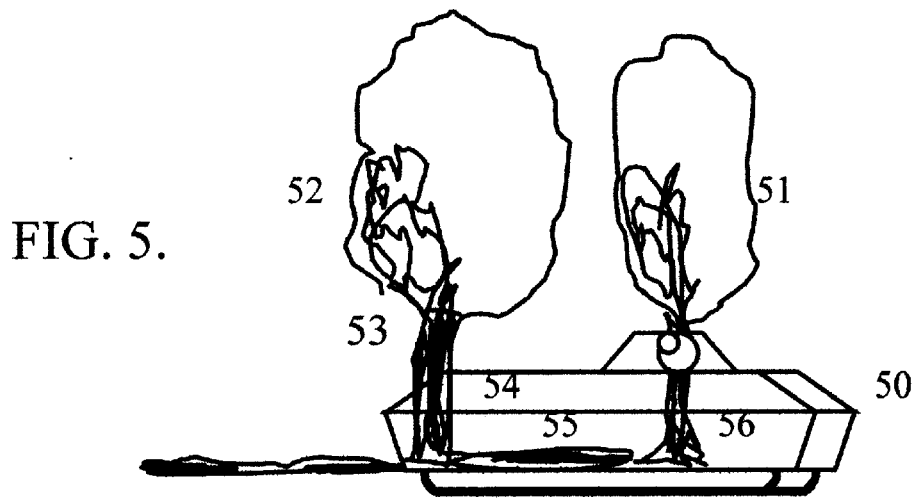
FIG. 5 is an observer's view of the resultant orthogonal projection gray-scale concealed tactical vehicle image with background.

In FIG. 5 the summing of the orthogonal images of all portions of the occulted background produces a concealed orthogonal projection of the total occulted background on the surface of the tank (50). The tree foliage in the background is represented by (51,52). The tree trunk in the background is represented by (53). The portions of the background projected onto the foreground as part of the concealed orthogonal projection are represented by (54,55, 56).

DESCRIPTION OF THE PREFERRED EMBODIMENT

The preferred embodiment of the present invention is as an orthogonal projection concealment apparatus for the Abrams battle tank as the mobile platform.

Radar is utilized as the means of sensing observer position and distance.

An acoustic system is utilized as the means of automatically sensing and estimating background distance.

A digital video camcorder is utilized as the means of continuously capturing background images.

A rectilinear array of packets of liquid crystal material is utilized for the pixel display array attached to the surface of the tank. The array is a passive, reflective, liquid crystal display controlled, light shutter.

All equipment used for the preferred embodiment of the present invention is available commercially from defense contracting sources.

DESCRIPTION OF OTHER EMBODIMENTS

Another embodiment of the present invention is as an orthogonal projection concealment apparatus for the Los Angeles Class fast attack submarine as the mobile platform.

Radar and sonar are utilized as the means of sensing observer position and distance on the surface of the water.

Radar and sonar are utilized as the means of sensing and estimating background distance automatically.

Another embodiment of the present invention is as an orthogonal projection concealment apparatus for the Lockheed F-117A airplane as the mobile platform.

Radar is utilized as the means of sensing observer position and distance.

Radar is utilized as the means of sensing and estimating background distance automatically.

All equipment used for these other embodiments of the present invention is available commercially from defense contracting sources.

What is claimed is:

1. An orthogonal projection concealment apparatus comprising,
   a mobile platform equipped with
   an internal power source, communicating power by and connected by appropriate wiring means to
   a power controller, communicating power by and connected by appropriate wiring means to
   a pixel array on said mobile platform surface consisting of a multiplicity of pixels, and said mobile platform further equipped with
   at least one means of sensing and manually inputing digital estimates of observer position and distance, and
   at least one means of sensing digital estimates of background distance automatically, and
   at least one means of continuously capturing digital background images,
   all means communicating electronic data by and connected by appropriate wiring means to said internal power source and additionally to,
   a microchip driven computing device, communicating data input by and connected by appropriate wiring means to said power controller, and said computing device comprising,
   a pixel location database, and
   programmed means of observer visible pixel selection, and
   gray-scale determination means of occulted background position, and
   positional algorithmic computational means, and
   programmed means whereby said power controller activates an individual pixel to project an orthogonal image of a portion of said occulted background perpendicular to the observer in his line of sight, whereby the summing of the orthogonal images of all portions of said occulted background produces a concealed orthogonal projection of the total occulted background.

2. The orthogonal projection concealment apparatus of claim 1, wherein said algorithmic computational programming means contains a predictive computational element.

3. The orthogonal projection concealment apparatus of claim 1, wherein said orthogonal projection image is selected from gray-scale and color.

4. The orthogonal projection concealment apparatus of claim 1, wherein said pixel array is a rectilinear array of packets of liquid crystal material.

5. The orthogonal projection concealment apparatus of claim 1, wherein said mobile platform is additionally equipped with a guidance sensing means communicating electronic data by and connected by appropriate wiring means to said internal power source and additionally to said microchip driven computing device.

6. The orthogonal projection concealment apparatus of claim 1, wherein said mobile platform is additionally equipped with a tilt and skew sensing and estimating means communicating electronic data by and connected by appropriate wiring means to said internal power source and additionally to said microchip driven computing device.

\* \* \* \* \*